US011945604B2

United States Patent
Vidy et al.

(10) Patent No.: US 11,945,604 B2
(45) Date of Patent: Apr. 2, 2024

(54) AIRCRAFT AND METHOD FOR DETERMINING LOADS ACTING ON AN AIRCRAFT

(71) Applicant: Airbus Defence and Space GmbH, Taufkirchen (DE)

(72) Inventors: Cyrille Vidy, Taufkirchen (DE); Christoph Meisner, Taufkirchen (DE); Christian Stolz, Taufkirchen (DE); Holger Hickethier, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 237 days.

(21) Appl. No.: 17/535,825

(22) Filed: Nov. 26, 2021

(65) Prior Publication Data
US 2022/0234763 A1    Jul. 28, 2022

(30) Foreign Application Priority Data

Jan. 22, 2021   (DE) ..................... 10 2021 101 353.4

(51) Int. Cl.
*B64F 5/60* (2017.01)
*G01P 15/08* (2006.01)

(52) U.S. Cl.
CPC ................ *B64F 5/60* (2017.01); *G01P 15/08* (2013.01)

(58) Field of Classification Search
CPC .. B64F 5/60; G01P 15/00; G01P 15/08; G06F 7/00; G06F 19/00; G05D 1/02;
(Continued)

(56) References Cited

U.S. PATENT DOCUMENTS 6,032,090 A * 2/2000 von Bose ............... G01G 19/07
  177/136
8,374,735 B2 * 2/2013 Blanc ................... G05D 1/0066
  701/3

(Continued)

FOREIGN PATENT DOCUMENTS

FR    2954488 A1    6/2011

OTHER PUBLICATIONS

German Search Report for Application No. 102021101353 dated Dec. 13, 2021.
(Continued)

*Primary Examiner* — John Kwon
*Assistant Examiner* — Johnny H Hoang
(74) *Attorney, Agent, or Firm* — KDW Firm PLLC

(57) ABSTRACT

An aircraft includes a control computer, load determining unit, first central inertial measurement device and a second inertial measurement device. The load determining unit is coupled to the first inertial measurement device and the second inertial measurement device. The load determining unit can receive instantaneous first accelerations detected by the first inertial measurement device and instantaneous second accelerations detected by the at least one second inertial measurement device and from this to determine instantaneous loads acting on the aircraft and to store them in a memory unit and/or to transmit them to an external unit. The load determining unit can determine expected maneuver accelerations. The load determining unit can subtract the expected maneuver accelerations from detected first accelerations and second accelerations and determine externally induced dynamic accelerations. The load determining unit can determine expected maneuver loads on the aircraft to determine dynamic loads on the aircraft and to determine the expected maneuver loads and the dynamic loads.

13 Claims, 1 Drawing Sheet

(58) Field of Classification Search
CPC ...... G05D 1/0204; G05D 1/00; G05D 1/0066; B64D 2045/0085; B64D 45/00; B64C 13/16; G07C 5/08
See application file for complete search history.

(56) References Cited

U.S. PATENT DOCUMENTS

| | | |
|---|---|---|
| 2004/0079835 A1 | 4/2004 | Volk |
| 2007/0096979 A1 | 5/2007 | Hinnant, Jr. et al. |
| 2010/0076624 A1 | 3/2010 | Hinnant, Jr. et al. |
| 2011/0313614 A1 | 12/2011 | Hinnant, Jr. et al. |
| 2012/0310449 A1 | 12/2012 | Hinnant, Jr. et al. |
| 2015/0100227 A1* | 4/2015 | Nance .................. B64D 45/00 701/124 |

OTHER PUBLICATIONS

European Search Report for Application No. 21209639 dated Apr. 28, 2022.

\* cited by examiner

AIRCRAFT AND METHOD FOR DETERMINING LOADS ACTING ON AN AIRCRAFT

CROSS-REFERENCE TO RELATED APPLICATION

This application claims priority to German Patent Application No. DE 10 2021 101 353.4 filed on Jan. 22, 2021, the entire disclosure of which is incorporated by reference herein.

TECHNICAL FIELD

The disclosure herein relates to an aircraft and a method for determining loads acting on an aircraft.

BACKGROUND

Different methods are known for determining structural loads on an aircraft. For example, strain gauges are known which measure local strains, wherein locally acting loads are estimated by transmission functions. There is a high calibration effort for load estimation, a necessarily large number of required strain gauges and also reliability with a tendency to be improved. In addition, the critical points at which strain gauges are to be attached must be well known before they are attached. Corrections, changes and modifications are hardly possible.

By using data from a central inertial measurement device (IMU), which mainly provides overall accelerations and velocities, only rigid body movements can be detected.

SUMMARY

It is therefore an object of the disclosure herein to provide an aircraft with an alternative way of detecting and storing load information for the assessment of the structural integrity of the aircraft, with which also dynamic and in particular gust-induced loads can be detected reliably, without having to provide excessive computing and analysis capabilities and at the same time great individuality in the original equipment and modification of the equipment of aircraft is possible.

This object is achieved by an aircraft disclosed herein. Advantageous embodiments and further developments are disclosed herein.

An aircraft is proposed having a control computer, an internal or external load determining unit, a first central inertial measurement device and at least one additional second inertial measurement device which is at a distance from the first inertial measurement device, wherein the load determining unit is coupled to the first inertial measurement device and at least one second inertial measurement device, wherein the load determining unit is designed to receive instantaneous first accelerations detected by the first inertial measurement device and instantaneous second accelerations detected by the at least one second inertial measurement device and to determine from this instantaneous loads acting on the aircraft and to store them in a memory unit and/or to transfer them to an external unit, wherein the load determining unit is designed to determine expected maneuver accelerations from the first accelerations and from position information provided by the control computer, wherein the load determining unit is designed to filter out the expected maneuver accelerations from the totality of the detected first accelerations and second accelerations and to determine dynamic accelerations on the aircraft from this, and wherein the load determining unit is designed to determine expected maneuver loads on the aircraft from the expected maneuver accelerations by a maneuver load model, to determine dynamic loads on the aircraft from the induced dynamic accelerations and to determine the sum of the expected maneuver loads and the dynamic loads as loads acting on the aircraft.

The aircraft can be a manned or unmanned aircraft. The load determining unit can, in principle, with knowledge of the mechanical properties of the aircraft and without strain gauges or the like, determine dynamic loads which act on the aircraft and which are interesting for the continuous determination of the integrity of the structure of the aircraft. Aging or fatigue can be monitored, and structural overloads can be detected. For this purpose, a central inertial measurement device, which is usually necessary for the control of an aircraft anyway, can be supplemented by further inertial measurement devices. The central inertial measurement device is hereinafter referred to as the "first inertial measurement device". It is usually arranged at a center of gravity or in an area close to the center of gravity of the aircraft. It is known as the "IMU" ("Inertial Measurement Unit") and can preferably detect accelerations in six spatial directions. This includes three translational acceleration directions and three rotational acceleration directions. The principle of action of the sensors used for this purpose is irrelevant.

The first accelerations which are detected by the first inertial measurement device are limited to the rigid accelerations of the center of gravity of the aircraft. These cannot in themselves give an impression of forces on the aircraft that have not yet led to acceleration but are nevertheless considered load events to be taken into account, for example due to gusts that could lead to an elastic deformation of the aircraft, which cannot be detected at the center of gravity.

A core of the disclosure herein now lies in providing at least one second inertial measurement device, which is arranged at a distance from the first inertial measurement device. This can be done at any measuring position, but such positions at which an elastic deformation can occur are suitable. At these measuring positions, characteristic deformations or oscillations can be detected, which go beyond the movements at the center of gravity.

Manned and unmanned aircraft are known in different variants. The disclosure herein is not limited to any of these variants. However, it is particularly suitable that the aircraft is a fixed-wing aircraft. In addition to compact, maneuverable aircraft with a relatively small wingspan and high stiffness or aircraft with a moderate aspect ratio, unmanned aerial vehicles with a large or very large wingspan are also known for flights at high or very high altitudes, such as MALE or HALE aircraft. In these case, due to the high aspect ratio, it could be appropriate to arrange at least a second inertial measurement device on a wing, preferably at a distance from the wing root in the wingspan direction. If the aircraft is hit by a gust, for example, the wing could deform elastically due to the high aspect ratio. As a result, the second inertial measurement device arranged on it can be moved in a characteristic manner relative to the first inertial measurement device.

The aim is now to use the load determining unit to determine the entire loads acting on the aircraft solely on the basis of detected accelerations and control maneuvers carried out. This is determined as the sum of maneuver loads and dynamic loads, wherein the dynamic loads in particular include dynamic aerodynamic loads and dynamic inertial loads.

The load determining unit can be an internal or external device. If the load determining unit is an internal device, it could be directly connected to the inertial measurement devices or receive a signal or data stream emanating from them. If the load determining unit is an external device, the loads acting on the aircraft could be determined on the ground, for example. For this purpose, it is conceivable that signals or data from the inertial measurement devices are transmitted as a data stream to a ground station in order to be processed there directly. Data records from successive time intervals could also be sent to the ground station at certain intervals in order to successively determine the loads there. Alternatively or in addition, the data could also be stored on board the aircraft and then transmitted in whole or in part on the ground. They may also be transmitted to another aircraft and evaluated there. Selective transmission on the ground or in the air could also take place by request. The evaluations and calculations explained below do not change in these cases.

Maneuver loads can be calculated by a maneuver load model, wherein control signals or control commands obtained from the control computer are used as the basis for expected maneuver loads. Using the control commands, the maneuver model can calculate loads which are to be expected from a maneuver which is carried out from an instantaneous position of the aircraft, the control commands, knowledge of all relevant aerodynamic and mass parameters as well as from environmental conditions. For a curved flight, for example, a bilateral aileron deflection could be initiated, which causes a rotation of the aircraft around its longitudinal axis. The ailerons introduce largely vertical forces acting on the wings, which lead to a torque with an effective lever arm determined by the distance to the longitudinal axis of the aircraft. This also applies in analogous form to all other control surfaces. The torque particularly loads the wing roots, at which the wings are joined to a fuselage of the aircraft. Depending on the shape and design of the aircraft, many different loads are to be expected at different locations of the aircraft due to a control or flight maneuver. These loads are all to be referred to as maneuver loads.

From the detected second accelerations, movements of measuring points away from the center of gravity can be detected, which involve a deviation compared to the detected first accelerations. From these, loads can be determined which exceed the expected maneuver loads.

Overall, the aircraft can carry out a particularly advantageous determination of loads acting on the aircraft and is not dependent on strain gauges or complex mathematical calculation methods. By dividing them into dynamic loads and maneuver loads, simplified load calculations can be carried out, which in particular only require matrix multiplication. Necessary mass or integration matrices can be determined in advance and stored in the load determining unit.

Preferably, the aircraft has multiple second inertial measurement devices at different installation positions. These may be arranged, among other things, on one or more wings at a distance from the wing root. It is conceivable to arrange second inertial measurement devices in the middle of the wings and at wing ends.

In a preferred embodiment, the load determining unit is designed to determine modal accelerations of the aircraft, which include rigid body modes and elastic modes of the aircraft, from the detected first accelerations and the detected second accelerations. In the second inertial measurement devices, accelerations can be detected in up to three translational and three rotational spatial directions, which reflect the movement of the respective installation point of the inertial measurement device in space. Such an installation point is referred to in the context of this disclosure as a measuring point. The detected first and second accelerations $a_m$ (index "m" for "measured") can be obtained in a dynamic model of the aircraft as a product of a modal matrix $\phi m$ and modal accelerations $\ddot{\xi}_m$ at the measuring positions. In order to determine the modal accelerations L of interest for further investigations, this equation can be reversed. Depending on the need, the modal accelerations include up to three translational rigid body-accelerations, up to three rotary rigid body accelerations and typical elastic eigenmodes, which can depend on the design of the aircraft. For the sake of simplicity, it may be a good idea not to take into account rigid body acceleration along the aircraft's longitudinal axis, since in this direction there are hardly any significant elastic deformations or other effects which affect the aircraft in a load which is to be taken into account.

The load determining unit may be designed in an advantageous embodiment to calculate dynamic modal accelerations as a product of a pseudo-inverse of a modal matrix of the aircraft and detected first accelerations and second accelerations and to remove a maneuver component from this. As explained above, the detected first and second accelerations $a_m$ in a dynamic model of the aircraft correspond to the product of the modal matrix $\phi m$ and modal accelerations at the $\ddot{\xi}_m$ at the measuring positions. The pseudo-inverse $\Phi_m^\dagger$ of the modal matrix $\phi m$ is therefore multiplied with detected accelerations $a_m$ to calculate the modal accelerations. The determination of the pseudo-inverses is useful here since the modal matrix $\phi m$ is not quadratic. The determination of the pseudo-inverses can be carried out, for example, by a least squares method. The first six terms of modal accelerations $\ddot{\xi}_m$, the measured rigid body accelerations $\ddot{\xi}_{RBm}$ ("RB" stands for rigid body here) at the center of gravity, i.e. translational and rotational components, and the other terms concern elastic modes of the aircraft. As mentioned above, the first rigid body acceleration along the longitudinal axis could also be omitted. Expected maneuver accelerations $\ddot{\xi}_{man}$ from a maneuver load model can be subtracted from the calculated modal accelerations $\ddot{\xi}_m$ to determine the dynamic component $\ddot{\xi}$, which is not caused by a planned maneuver, but by elastic properties of the aircraft and externally induced movements, such as gusts.

As an alternative to the determination of the modal maneuver accelerations for removing the maneuver component, filtering of the detected accelerations can also be carried out. This could be achieved, for example, by specifying a cut-off frequency below which accelerations are considered maneuver accelerations and above which dynamic effects can be observed. The cut-off frequency should be chosen in such a way that the maneuver component and the remaining dynamic component are clearly distinguished from each other.

More preferably, the load determining unit may be designed to determine dynamic inertial loads at selected observation points by multiplying an inertial integration matrix determined in advance and the dynamic modal accelerations. Node mass forces at each point of the dynamic model are determined by the product of a mass matrix, the modal matrix of the aircraft and the modal acceleration as $F_{mass} = -M\phi\ddot{\xi}$. Dynamic inertial loads F mass MS (MS stands for "monitoring station", i.e. observation point) at a particular observation point can be determined by summing up all the mass forces acting on that observation point as a product of a predetermined inertial integration matrix $G_{MS}$ and the node mass forces $F_{mass}$. This can be converted to $$F_{mass\ MS} = G_{MS} F_{mass} = -G_{MS} M \phi \ddot{\xi} - G_{MS\ mass} \ddot{\xi}.$$

For the sake of simplicity, instead of $G_{MS}$, $G_{MS\ mass}$ could also be determined and stored as a predetermined integration matrix. The mass states contained therein, which depend, among other things, on a quantity of fuel and the load, could be determined by a lookup table with information about expected generalized mass changes. The integration matrices can be determined for each point in the aircraft based on a dynamic model of the aircraft. The modal matrix could also change with the mass states, wherein however a modal base can cover a wide range of mass states. The modal matrix can also be queried variably with lookup tables and linear interpolation.

In an advantageous embodiment, the load determining unit is designed to determine dynamic aerodynamic loads at observation points by multiplying a predetermined aerodynamic integration matrix and the dynamic modal accelerations. This can be done, for example, by a kind of dynamic trimming, by which the generalized rigid body mass forces are balanced with the generalized aerodynamic rigid body forces. The external forces are in principle balanced by the inertial forces. Generalized rigid body mass forces are determined by the product of the node mass forces and the rigid body modal matrix:

$$GMF_{RB} = -\Phi_{TB}^T M \phi_{RB} \ddot{\xi}_{RB},$$

wherein $\phi_{RB}$ is the rigid body modal matrix, with translational motion components in the y-direction and the z-direction ($T_y$, $T_z$) as well as rotations around the x, y and z axes ($R_x$, $R_y$, $R_z$). The aerodynamic rigid body forces, which are mainly quasi-stationary, result, taking into account gusts with $W = W_{gust} + W_{RB}$, in $F_{aero\ RB} = q_\infty (Q_{RB} W + Q_{\dot{R}B} \dot{W})$ with $Q_{RB}$ as an aerodynamic stiffness matrix, which depends mainly on the angle of attack and $Q_{\dot{R}B}$ as the aerodynamic damping matrix, which can depend mainly on the change of the angle of attack with time, but also directly on the angle of attack. The sideslip angle and its first derivative and the derivative of the roll angle in addition to the angle of attack and its first derivative also play a role when not only vertical, but also lateral or asymmetrical gusts are taken into account. The term W is to be understood here as an angle of attack and a sideslip angle, $\dot{W}$ as the first derivative of the angle of attack, sideslip and roll. The generalized aerodynamic rigid body force can be determined as follows: $GAF_{RB} = \Phi_{RB}^T F_{aero\ RB}$, and after conversion this now—results in $$\begin{bmatrix} W \\ \dot{W} \end{bmatrix} = (q_\infty \Phi_{RB}^T [Q_{RB}\ Q_{\dot{R}B}])^{-1} \Phi_{RB}^T M \Phi_{RB} \ddot{\xi}_{RB}.$$

From this, aerodynamic node loads at any point of the dynamic model can be determined as follows: $F_{aero\ MS} = G_{MS\ aero\ RB} \ddot{\xi}_{RB}$, wherein $GMS_{aero\ RB}$ is also an integration matrix, which depends on mass states and aerodynamic states.

Finally, the load determining unit may be designed to calculate a load present at the observation point as the sum of the dynamic aerodynamic loads, the dynamic inertial loads and the expected maneuver loads. According to this method, the summed up loads of the aerodynamic loads and the inertial loads automatically result in the balanced loads (i.e. the sum of all forces is zero).

In summary, the loads acting on the aircraft can therefore be determined on the basis of matrix multiplications exclusively. Neither time integration nor derivation is necessary to determine loads. In particular, individual determinations of gust speeds are not required and will not be carried out. Load determination is essentially based on the difference between predicted or expected maneuver accelerations and measured actual accelerations. In principle, this significantly reduces the effort required for load determination and leads to significantly lower requirements on a processor, wherein no strongly fluctuating computing power has to be called up depending on the situation. As a result, the load determining unit can be dimensioned in such a way that on the one hand it has very low power consumption and on the other hand produces only a little waste heat and takes up only a small installation space.

Particularly preferably, the load determining unit is designed to compare the loads acting on the aircraft with permissible loads and to generate a maintenance note and to store it in the memory unit and/or to transfer it to the external unit if the loads acting on the aircraft exceed the permissible loads. Due to the determined and stored loads, event monitoring can be realized by comparing permissible load envelopes and calculated loads. The maintenance instruction can prompt a targeted check with regard to any impairments of a structure of the aircraft caused, for example, by a strong gust. This can also be part of a health monitoring system.

Finally, it is advantageous if the load determining unit is designed to carry out a failure estimation at at least one observation point using determined loads and a transmission function. This too can be part of a health monitoring system.

The disclosure herein further relates to a method for determining loads acting on an aircraft which is formed analogously to the preceding versions of the aircraft. The method includes the detection of instantaneous first accelerations by a first inertial measurement device in the aircraft, the detection of instantaneous second accelerations by at least a second inertial measurement device in the aircraft, which is arranged at a distance from the first inertial measurement device, the determination of loads acting on the aircraft by determining expected maneuver accelerations from the first accelerations and from position information provided by a control computer, filtering out the expected maneuver accelerations from the totality of the detected first accelerations and second accelerations and thereby determining dynamic accelerations on the aircraft, and determining expected maneuver loads from the expected maneuver accelerations by a maneuver load model, determining dynamic loads on the aircraft from the induced dynamic accelerations, and determining the sum of the expected maneuver loads and the dynamic loads as loads acting on the aircraft, and storing them in a memory unit and/or transferring them to an external unit.

In an advantageous embodiment, the method further includes the determination of modal accelerations of the aircraft, which include rigid body modes and elastic modes of the aircraft, from the detected first accelerations and the detected second accelerations.

The method may also include the calculation of dynamic modal accelerations as a product of a pseudo-inverse of a modal matrix of the aircraft and detected first accelerations and second accelerations and removal of a maneuver component.

Thus, analogous to the previous method, the method may also include the determination of dynamic inertial loads at observation points by multiplying an inertial integration matrix determined in advance and the dynamic modal accelerations.

The method may include the determination of dynamic aerodynamic loads at observation points by multiplying a predetermined aerodynamic integration matrix and the dynamic modal accelerations.

Finally, the method may include the calculation of a load present at the observation points as the sum of the dynamic aerodynamic loads, the dynamic inertial loads and the expected maneuver loads.

BRIEF DESCRIPTION OF THE DRAWINGS

Further features, advantages and possible applications of the disclosure herein result from the following description of the example embodiments and the figures. In this process, all described and/or pictorially represented features in themselves and in any combination form the subject-matter of the disclosure herein also regardless of their composition in the individual claims or their references. In the figures, the same reference characters continue to designate the same or similar objects.

DETAILED DESCRIPTION

Figure 1:
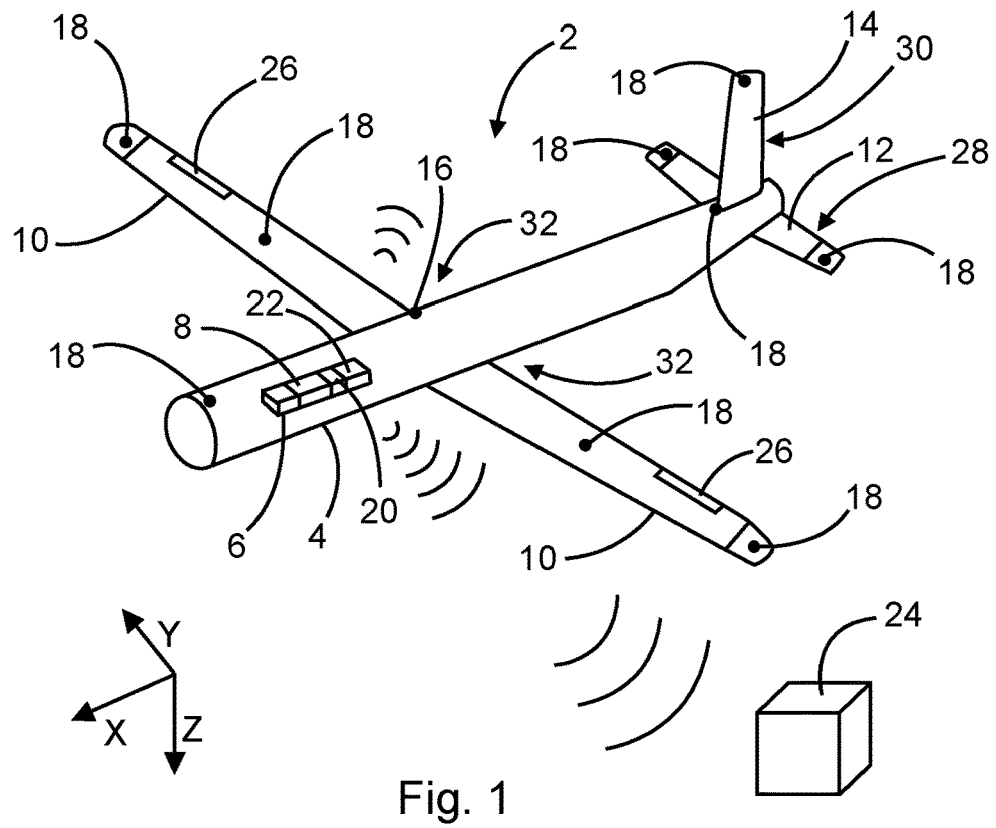
FIG. 1 shows an aircraft according to the disclosure herein with several inertial measurement devices in a schematic representation.

FIG. 1 shows by way of example an unmanned aircraft 2 which has a fuselage 4 in which a control computer 6 and a load determining unit 8 are arranged. The representation is only example in nature, other embodiments are also conceivable. Here, the aircraft 2 has two wings 10, which protrude laterally from the fuselage 4. Its aspect ratio is relatively large, so that a noticeable elastic deformation behaviour is to be expected. A horizontal stabilizer 12 and a vertical stabilizer 14 are arranged in a rear area. The aircraft 2 in this example embodiment is therefore a fixed-wing aircraft with a fairly conventional configuration.

For longer use, it may be useful to continuously determine and store loads acting on the aircraft 2 in order to get an impression of the structural state of the aircraft 2. The load determining unit 8 in conjunction with multiple sensors is used to determine the loads. By way of example, a first inertial measurement device 16 is provided for this, which is largely arranged at a center of gravity of the aircraft 2. At a distance from this, multiple second inertial measurement devices 18 are provided, which are arranged, for example, in the middle on the wings 14 and at the ends of the wings 14, as well as the fuselage 4, the horizontal stabilizer 12 and the vertical stabilizer 14. All inertial measurement devices 16 and 18 are designed to detect accelerations in space, in particular translational accelerations in the Y and Z directions and rotational accelerations around the X, Y and Z axes. The load determining unit 8 is connected to the inertial measurement devices 16 and 18 and is designed to receive and process the detected accelerations.

The load determining unit 8 is designed to receive instantaneous first accelerations detected by the first inertial measurement device 16 and instantaneous second accelerations detected by the second inertial measurement devices 18 and to determine from these instantaneous loads acting on the aircraft 2 and to store them in a memory unit 20. Alternatively or in addition to this, it would be conceivable to transfer data about the determined loads through a data transmission unit 22 to an external unit 24. The load determining unit 8 is designed to determine expected maneuver accelerations from the first accelerations as well as from the position information of the aircraft 2 provided by the control computer 6, i.e. its position in space. These can depend on positions of ailerons 26, elevators 28 and a rudder 30 or other control surfaces. The load determining unit 8 is further designed to filter out the expected maneuver accelerations from the totality of the detected first accelerations and second accelerations and to determine dynamic accelerations on the aircraft 2 from this. The load determining unit 8 is designed to determine expected maneuver loads on the aircraft 2 from the expected maneuver accelerations by a maneuver load model, to determine dynamic loads on the aircraft 2 from the induced dynamic accelerations and to determine the sum of the expected maneuver loads and the dynamic loads as loads acting on the aircraft 2. For example, the modal accelerations of the aircraft 2 can be determined, which include the rigid body modes and elastic modes of the aircraft 2. For further optimization of a state analysis, the load determining unit 8 is for example designed to compare the loads acting on the aircraft 2 with permissible loads and to generate a maintenance note and to store it in the memory unit 20 and/or to transfer it to the external unit 24 if the loads acting on the aircraft 2 exceed the permissible loads. The load determining unit 8 is also for example designed to carry out a failure assessment at at least one observation point, such as a wing root 32, using determined loads and a suitable transfer function.

Figure 2:
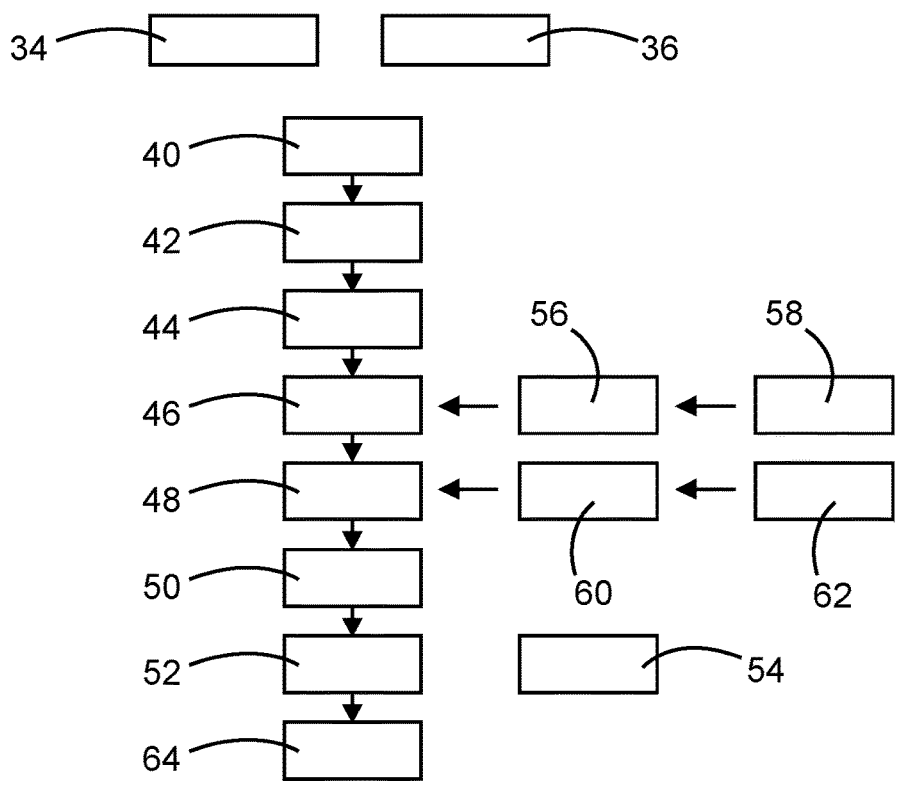
FIG. 2 shows a schematic, block-based diagram of a method according to the disclosure herein.

In FIG. 2, the method according to the disclosure herein is shown schematically in a block-based representation. The method includes the steps of detecting 34 instantaneous first accelerations by the first inertial measurement device 16 in the aircraft 2, detecting 36 instantaneous second accelerations by the second inertial measurement devices 18 in the aircraft 2 and the determination 38 of loads acting on the aircraft 2. This includes the determination 40 of expected maneuver accelerations from the first accelerations as well as from position information provided by a control computer 6, the filtering out 42 of the expected maneuver accelerations from the totality of the detected first accelerations and second accelerations, and the determination 44 of dynamic accelerations on the aircraft 2 from this, the determination 46 of expected maneuver loads from the expected maneuver accelerations by a maneuver load model, the determination 48 of dynamic loads on the aircraft 2 from the induced dynamic accelerations, and the determination 50 of the sum of the expected maneuver loads and the dynamic loads as loads acting on the aircraft 2. Subsequently, storing 52 in the memory unit 20 and/or transferring 54 to the external unit 24 can be carried out. To determine 46 the expected maneuver loads, the method may include the determination 56 of modal accelerations of the aircraft 2, which include rigid body modes and elastic modes of the aircraft 2, from the detected first accelerations and the detected second accelerations. The determination 56 of the modal accelerations includes by way of example the calculation 58 of dynamic modal accelerations as a product of a pseudo-inverse of a modal matrix of the aircraft 2 and detected first accelerations and second accelerations and the removal of a maneuver component. Determining 48 the dynamic loads includes by way of example the determination 60 of dynamic inertial loads at observation points by multiplying a predetermined inertial integration matrix and the dynamic modal accelerations. Furthermore, the method includes the determination 62 of dynamic aerodynamic loads at observation points by multiplying a predetermined aerodynamic integration matrix and the dynamic modal accelerations.

Finally, as explained above, the calculation 64 of a load present at the observation points is carried out as the sum of the dynamic aerodynamic loads, the dynamic inertial loads and the expected maneuver loads.

In addition, it should be noted that "including" does not exclude any other elements or steps, and "one" or "a" does not exclude a plurality. Furthermore, it should be noted that features which have been described with reference to one of the above example embodiments can also be used in combination with other features of other example embodiments described above. Reference characters in the claims are not to be regarded as a restriction.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE CHARACTERS

2 Aircraft
4 Fuselage
6 Control computer
8 Lad determining unit
10 Wing
12 Horizontal stabilizer
14 Vertical stabilizer
16 First inertial measurement device
18 Second inertial measurement device
20 Memory unit
22 Data transmission unit
24 External unit
26 Aileron
28 Elevator
30 Rudder
32 Wing root
34 Detecting instantaneous first accelerations
36 Detecting instantaneous second accelerations
38 Determining loads acting on the aircraft
40 Determining expected maneuver accelerations
42 Filtering out expected maneuver accelerations
44 Determining dynamic accelerations
46 Determining expected maneuver loads
48 Determining dynamic loads
50 Determining the sum of loads
52 Storing
54 Transferring
56 Determining modal accelerations
58 Calculating dynamic modal accelerations
60 Determining dynamic inertial loads
62 Determining dynamic aerodynamic loads
64 Calculating the load

The invention claimed is:

1. An aircraft, comprising:
a control computer;
a load determining unit;
a first, central inertial measurement device; and
at least one additional second inertial measurement device at a distance from the first inertial measurement device;
wherein the load determining unit is coupled to the first inertial measurement device and the at least one second inertial measurement device,
wherein the load determining unit is configured to receive instantaneous first accelerations detected by the first inertial measurement device and instantaneous second accelerations detected by the at least one second inertial measurement device,
wherein the load determining unit is configured to determine instantaneous loads acting on the aircraft based on the instantaneous first accelerations and based on the instantaneous second accelerations and to store the instantaneous loads acting on the aircraft in a memory unit or to transfer the instantaneous loads acting on the aircraft to an external unit,
wherein the load determining unit is configured to determine expected maneuver accelerations from the first accelerations and from position information provided by the control computer,
wherein the load determining unit is configured to determine dynamic accelerations on the aircraft by filtering out the expected maneuver accelerations from a totality of the detected first accelerations and second accelerations,
wherein the load determining unit is configured to determine expected maneuver loads on the aircraft from the expected maneuver accelerations by a maneuver load model, to determine dynamic loads on the aircraft from the induced dynamic accelerations and to determine a sum of the expected maneuver loads and the dynamic loads as loads acting on the aircraft, and
wherein the load determining unit is configured to determine modal accelerations of the aircraft, which include rigid body modes and elastic modes of the aircraft, from the detected first accelerations and the detected second accelerations.

2. The aircraft according to claim 1, wherein the aircraft has several second inertial measurement devices at different installation positions.

3. The aircraft according to claim 1, wherein the load determining unit is configured to calculate dynamic modal accelerations as a product of a pseudo inverse of a modal matrix of the aircraft and detected first accelerations and second accelerations and to remove a maneuver component.

4. The aircraft according to claim 3, wherein the load determining unit is configured to determine dynamic inertial loads at observation points by multiplying a predetermined inertial integration matrix and the dynamic modal accelerations.

5. The aircraft according to claim 3, wherein the load determining unit is configured to determine dynamic aerodynamic loads at observation points by multiplying a predetermined aerodynamic integration matrix and the dynamic modal accelerations.

6. The aircraft according to claim 3, wherein the load determining unit is configured to calculate a load present at observation points as a sum of the dynamic aerodynamic loads, the dynamic inertial loads and the expected maneuver loads.

7. The aircraft according to claim 1, wherein the load determining unit is configured:
- to compare the loads acting on the aircraft with permissible loads;
- to generate a maintenance note; and
- to store the maintenance note in the memory unit or to transfer the maintenance note to the external unit if the loads acting on the aircraft exceed the permissible loads.

8. The aircraft according to claim 1, wherein the load determining unit is configured to carry out a failure assessment at at least one observation point by using determined loads and a transfer function.

9. A method for determining loads acting on an aircraft, including:
- detecting instantaneous first accelerations by a first inertial measurement device in the aircraft;
- detecting instantaneous second accelerations by at least one second inertial measurement device in the aircraft, which is arranged at a distance from the first inertial measurement device;
- determining loads acting on the aircraft by:
  - determining expected maneuver accelerations from the first accelerations and from position information provided by a control computer;
  - determining dynamic accelerations on the aircraft by filtering out the expected maneuver accelerations from a totality of the detected first accelerations and second accelerations;
  - determining expected maneuver loads from the expected maneuver accelerations by a maneuver load model;
  - determining dynamic loads on the aircraft from the induced dynamic accelerations; and
  - determining a sum of the expected maneuver loads and the dynamic loads as loads acting on the aircraft;
- storing the loads acting on the aircraft in a memory unit or transferring the loads acting on the aircraft to an external unit; and
- determining modal accelerations of the aircraft, which include rigid body modes and elastic modes of the aircraft, from the detected first accelerations and the detected second accelerations.

10. The method according to claim 9, further including calculating dynamic modal accelerations as a product of a pseudo-inverse of a modal matrix of the aircraft and detected first accelerations and second accelerations and removal of a maneuver component.

11. The method according to claim 10, further including determining dynamic inertial loads at observation points by multiplying a predetermined inertial integration matrix and dynamic modal accelerations.

12. The method according to claim 10, further including determining dynamic aerodynamic loads at observation points by multiplying a predetermined aerodynamic integration matrix and the dynamic modal accelerations.

13. The method according to claim 10, further including calculating load present at the observation points as a sum of the dynamic aerodynamic loads, the dynamic inertial loads and the expected maneuver loads.

* * * * *

UNITED STATES PATENT AND TRADEMARK OFFICE
CERTIFICATE OF CORRECTION

PATENT NO. : 11,945,604 B2
APPLICATION NO. : 17/535825
DATED : April 2, 2024
INVENTOR(S) : Cyrille Vidy et al.

Page 1 of 1

It is certified that error appears in the above-identified patent and that said Letters Patent is hereby corrected as shown below:

In the Specification

Column 4, Line 8: "modal accelerations L of interest" should be -- modal accelerations $\ddot{\xi}_m$ of interest --.

Column 4, Line 64: "inertial loads F mass MS" should be -- inertial loads F $_{\text{mass MS}}$ --.

Signed and Sealed this
Fourth Day of March, 2025

Coke Morgan Stewart
*Acting Director of the United States Patent and Trademark Office*